(12) United States Patent
Chang et al.

(10) Patent No.: US 9,157,520 B2
(45) Date of Patent: Oct. 13, 2015

(54) MOTION GUIDE APPARATUS

(71) Applicant: Hiwin Technologies Corp., Taichung (TW)

(72) Inventors: Che Kang Chang, Taichung (TW); Zong Sian Jiang, Taichung (TW); Zong Sian Tsai, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 406 days.

(21) Appl. No.: 13/834,297

(22) Filed: Mar. 15, 2013

(65) Prior Publication Data
US 2014/0260734 A1  Sep. 18, 2014

(51) Int. Cl.
*F16H 25/12* (2006.01)
*F16H 57/04* (2010.01)
*F16H 25/22* (2006.01)

(52) U.S. Cl.
CPC ........ *F16H 57/0497* (2013.01); *F16H 25/2219* (2013.01); *Y10T 74/18744* (2015.01)

(58) Field of Classification Search
CPC ............ F16H 25/2238; F16H 25/2285; F16H 25/2295; F16H 25/2233; F16H 57/0427; F16H 25/12; F16H 57/0497; F16H 25/2219
See application file for complete search history.

(56) References Cited

U.S. PATENT DOCUMENTS

| | | | |
|---|---|---|---|
| 888,619 A * | 5/1908 | Kelly | 74/89.44 |
| 3,885,842 A | 5/1975 | Furutsu | |
| 3,940,191 A | 2/1976 | Tomioka et al. | |
| 6,152,606 A | 11/2000 | Shirosaki et al. | |
| 7,036,989 B2 * | 5/2006 | Taki et al. | 384/475 |
| 7,220,059 B2 | 5/2007 | Gobel et al. | |
| 2006/0051005 A1 * | 3/2006 | Schott | 384/462 |

* cited by examiner

*Primary Examiner* — William Kelleher
*Assistant Examiner* — Terence Boes
(74) *Attorney, Agent, or Firm* — Charles E. Baxley (57) ABSTRACT

A motion guide apparatus includes a cylindrical member having a peripheral protrusion formed between two outer peripheral recesses, a housing engaged onto the cylindrical member and having a peripheral swelling formed between two peripheral depressions, a number of bearing members engaged between the cylindrical member and the housing, and two actuating ring members each having a number of orifices for engaging with the bearing members and each having an inner side portion directed toward the peripheral protrusion and the peripheral swelling, and each having an operating device extended into the gap that is formed between the peripheral protrusion and the peripheral swelling for wiping the lubricating oil.

10 Claims, 7 Drawing Sheets

FIG. 9

MOTION GUIDE APPARATUS

BACKGROUND OF THE INVENTION

1. Field of the Invention

The present invention relates to a motion guide apparatus, such as a ball screw device, and more particularly to a motion guide apparatus or ball screw device including a number of ball or roller bearing members disposed or attached or mounted or engaged between two movable members, such as an elongated bolt or screw shaft and a ball nut member, and a lubricating device for supplying or applying or distributing the lubricating grease or oil into the helical threaded portions or grooves of the movable members and for suitably lubricating the ball or roller bearing members.

2. Description of the Prior Art

Various kinds of typical motion guide apparatuses, such as the linear motion guide apparatuses or the ball screw devices have been developed and comprise two movable members rotatable or movable relative to each other, and a number of ball or roller bearing elements disposed between the two movable members for facilitating the sliding movement between the two movable members.

For example, U.S. Pat. No. 3,885,842 to Furutsu, U.S. Pat. No. 3,940,191 to Tomioka et al., U.S. Pat. No. 6,152,606 to Shirosaki et al., and U.S. Pat. No. 7,220,059 to Gobel et al. disclose several of the typical motion guide apparatuses or ball screw devices each comprising a ball nut pivotally or rotatably coupled onto a screw shaft, and a number of loaded ball bearing elements disposed between the screw shaft and the ball nut for facilitating the sliding movement between the screw shaft and the ball nut, and each further comprising an outer bearing ring and an inner bearing ring and a number of tapered rollers which roll between the bearing rings in two rows next to one another on the raceways of the bearing rings and kept apart at uniform distances by a respective bearing cage.

With the fitting of the bearing in machines or the like, the individual rings are usually positioned relative to one another by an interference fit on a shaft in such a way that production-related tolerances during the production of the individual parts of the antifriction bearing are compensated for, and defined axial prestress is produced between the tapered rollers of both rows. This axial prestress enables the bearing to roll free of play to the greatest possible extent under load.

The measures for defining the degree of the axial prestressing of the individual rings of an axially split bearing ring relative to one another, which measures were known up to the time of the prior patents and are still customary today, were in this case either to grind down the end faces of the touching end faces of the individual rings in an appropriately dimensionally accurate manner or to grind down in a dimensionally accurate manner the end faces of a separate distance ring arranged between the individual rings and then to join together all the individual parts in an accurately fitting manner.

A conceivable improvement of this state would therefore be to already connect together the individual rings of the axially split bearing at the bearing manufacture by means of clamping rings of U-shaped cross section. However, such clamping rings, which are usually made of thin metal sheets or of plastic, are not suitable for producing or for maintaining defined axial prestress between the individual rings of the axially split bearing ring and/or between the rolling elements of both rows as they roll on their raceways respectively.

In addition, the ball nut should be specially designed and machined for fitting or mounting the guide members such that the manufacturing procedures for the typical ball screw devices will be complicated and such that the manufacturing costs for the typical ball screw device will be greatly increased.

The present invention has arisen to mitigate and/or obviate the afore-described disadvantages of the conventional motion guide apparatuses.

SUMMARY OF THE INVENTION

The primary objective of the present invention is to provide a motion guide apparatus including a number of ball or roller bearing members disposed or attached or mounted or engaged between two movable members, such as an elongated bolt or screw shaft and a ball nut member, and a lubricating device for supplying or applying or distributing the lubricating grease or oil into the helical threaded portions or grooves of the movable members and for suitably lubricating the ball or roller bearing members.

In accordance with one aspect of the invention, there is provided a motion guide apparatus comprising a cylindrical member including an outer peripheral portion, and including two peripheral recesses formed in the outer peripheral portion of the cylindrical member and spaced from each other for forming and defining a peripheral protrusion between the peripheral recesses of the cylindrical member, a cylindrical housing including a bore formed therein for receiving and engaging with the cylindrical member, and including two peripheral depressions formed in the housing and spaced from each other for forming and defining a peripheral swelling between the peripheral depressions of the housing and for aligning with the peripheral protrusion of the cylindrical member and for forming and defining a peripheral gap between the peripheral protrusion and the peripheral swelling, the housing including an entrance for supplying a lubricating oil into the peripheral gap that is formed between the peripheral protrusion of the cylindrical member and the peripheral swelling of the housing, a number of bearing members received and engaged in the peripheral recesses of the cylindrical member and the peripheral depressions of the housing and engaged with the peripheral protrusion and the peripheral swelling for guiding the housing to rotate relative to the cylindrical member, and two actuating ring members each including a number of orifices formed therein for receiving and engaging with the bearing members respectively and for allowing the bearing members and the actuating ring members to be received and engaged between the housing and the cylindrical member, the actuating ring members each including an inner side portion directed toward the peripheral protrusion and the peripheral swelling, and each including an operating device provided in the inner side portion of the actuating ring member and extended into the peripheral gap that is formed between the peripheral protrusion and the peripheral swelling for engaging with and for wiping or guiding the lubricating oil to flow toward the actuating ring members and the bearing members in order to lubricate the bearing members.

The operating device includes two tongues extended from the inner side portion of the actuating ring member for forming a space between each of the tongues and the actuating ring member. The tongues are extended radially and outwardly from the inner side portion of the actuating ring member and opposite to each other for forming a V-shaped structure and for forming a notch between the tongues.

The actuating ring member includes a first orifice having a center for receiving and engaging with a first bearing member, and includes a concentric circle provided around the first orifice of the actuating ring member and the first bearing member, and the concentric circle includes a diameter (D) equal to or no greater than a width (W) of the actuating ring member and greater than a diameter (d) of the first orifice of the actuating ring member for forming an annular member, the tongues are extended from the annular member.

The diameter (D) of the concentric circle is about 1.15 to 2 times of the diameter (d) of the first orifice of the actuating ring member. The diameter (D) of the concentric circle is greater than the diameter (d) of the first orifice of the actuating ring member for a width (F), and the annular member includes a width (F) for supporting the tongues.

The tongue includes a tip extended and separated from the inner side portion of the actuating ring member for a spacing distance (H) and for forming an opening for the space that is formed between the tongue and the actuating ring member. The spacing distance (H) is no greater than a width (T) of the peripheral protrusion of the cylindrical member.

The tongue includes a normal line extended from the tip and perpendicular to and intersected with the inner side portion of the actuating ring member at a first intersected point, and the tongue includes an inner side surface having an outer segment spaced from the normal line for an included angle (A) and intersected with an extension line of the inner side portion of the actuating ring member at a second intersected point.

A linking line from the first intersected point to the center of the first orifice of the actuating ring member and the first bearing member is intersected with the concentric circle at a third intersected point, and a first line segment between the first and the third intersected points forms a first side portion of the space between the tongue and the actuating ring member, a coupling line from the second intersected point to the center of the first orifice of the actuating ring member and the first bearing member is intersected with the concentric circle at a fourth intersected point, and a second line segment between the second and the fourth intersected points and the outer segment of the inner side surface of the tongue form a second side portion of the space between the tongue and the actuating ring member. A third line segment between the third and the fourth intersected points forms a root portion of the space between the tongue and the actuating ring member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-3 and 5-6, a motion guide apparatus in accordance with the present invention comprises an elongated bolt or screw shaft 10 including a number of helical threaded portions or grooves 11 formed on the outer peripheral portion thereof, or formed in the outer peripheral surface 12 thereof, and a movable member, such as a cylindrical member or ball nut 2 including a screw hole 21 formed therein and formed or defined by a number of helical threaded portions or grooves 22 for receiving or engaging with the elongated screw shaft 10, and for threading or engaging with the helical threaded portions or grooves 11 of the screw shaft 10, and for forming or defining one or more endless ball guiding passages 8 in the ball screw device or between the screw shaft 10 and the ball nut 2 and for slidably receiving or engaging with a number of ball bearing members or a bearing device 80.

The ball nut 2 further includes a passage or pathway or conduit 23 laterally or axially formed therein, and opened through both the end portions 24 thereof, and one or more (such as two) deflecting members 25 attached or mounted or engaged into the end portions 24 of the ball nut 2 and at the end portions of the conduit 23 of the ball nut 2, and each deflecting member 25 include a deflecting passage or pathway 26 formed therein (FIGS. 1, 5) and aligned with or communicating with the conduit 23 and the helical threaded portion or groove 22 of the ball nut 2 for forming or defining the endless ball guiding passage 8 in the ball screw device and for smoothly receiving or engaging with the ball bearing device 80 which may be provided and used for facilitating the sliding and/or the rotational movement between the screw shaft 10 and the ball nut 2.

The above-described structure or configuration for the screw shaft 10 and the ball nut 2 and the ball bearing device 80 that are provided and disposed or attached or mounted or engaged between the screw shaft 10 and the ball nut 2 is typical and will not be described in further details. The ball nut 2 further includes an outer peripheral portion or surface 20, and one or more (such as two) circular or annular or peripheral recesses 27, 28 formed or provided in the outer peripheral portion or surface 20 of the ball nut 2 and spaced or separated from each other for forming or defining a circular or annular or peripheral bulge or swelling or protrusion 29 between the circular or annular or peripheral recesses 27, 28 of the ball nut 2 and for suitably receiving or engaging with two rows of ball or roller bearing members 90, 91 therein respectively, best shown in FIG. 5.

The motion guide apparatus in accordance with the present invention further comprises a cylindrical member or barrel or sleeve or outer housing 30 including a bore 31 formed therein for receiving or engaging with the ball nut 2 and for engaging with the bearing members 90, 91 for allowing the cylindrical housing 30 to be disposed or attached or mounted or secured or engaged onto the ball nut 2 and to be pivoted or rotated relative to the ball nut 2. For example, the housing 30 includes one or more (such as two) circular or annular or peripheral depressions 32, 33 formed or provided in the inner peripheral portion thereof and spaced or separated from each other for forming or defining a circular or annular or peripheral bulge or protrusion or swelling 34 between the circular or annular or peripheral depressions 32, 33 of the housing 30 and for suitably receiving or engaging with the bearing members 90, 91 therein respectively, also best shown in FIG. 5.

The bearing members 90, 91 may thus be suitably and solidly and stably received or engaged in the peripheral recesses 27, 28 of the ball nut 2 and the peripheral depressions 32, 33 of the housing 30 respectively and contacted or engaged with the peripheral protrusion 29 of the ball nut 2 and the peripheral swelling 34 of the housing 30 for facilitating the sliding and/or the rotational movement between the housing 30 and the ball nut 2. The housing 30 further includes a mouth or orifice or inlet or entrance 35 formed therein, such as formed through the peripheral swelling 34 of the housing 30 and communicating with the peripheral space or gap 36 that is formed or defined between the peripheral protrusion 29 and the peripheral swelling 34 for selectively supplying or applying or filling or distributing the lubricating grease or oil into the peripheral space or gap 36 that is formed or defined between the peripheral protrusion 29 of the ball nut 2 and the peripheral swelling 34 of the housing 30.

The motion guide apparatus in accordance with the present invention further comprises one or more (such as two) anchoring or retaining or positioning or operating or actuating ring members 40, 41 each including a number of holes or apertures or orifices 42 formed therein for receiving or engaging with the bearing members 90, 91 respectively and for allowing the bearing members 90, 91 and the actuating ring members 40, 41 to be suitably and solidly and stably received or engaged between the housing 30 and the ball nut 2. The actuating ring members 40, 41 each include one side or inner portion 43 faced or directed toward the peripheral protrusion 29 and the peripheral swelling 34 and the peripheral gap 36 that is formed or defined between the peripheral protrusion 29 and the peripheral swelling 34, and each include a agitating or actuating or wiping or operating element or device 50 formed or provided in the one side or inner portion 43 thereof and extended into the peripheral gap 36 that is formed or defined between the peripheral protrusion 29 of the ball nut 2 and the peripheral swelling 34 of the housing 30 for engaging with and for guiding the lubricating grease or oil to flow toward the bearing members 90, 91 and/or the actuating ring members 40, 41.

Figure 7:
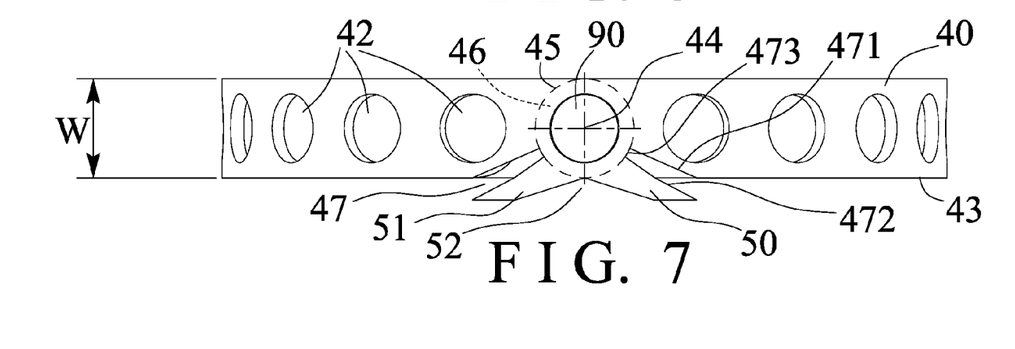
FIG. 7 is a plan schematic view illustrating one of the anchoring or positioning or retaining rings of the motion guide apparatus.
Figure 8:
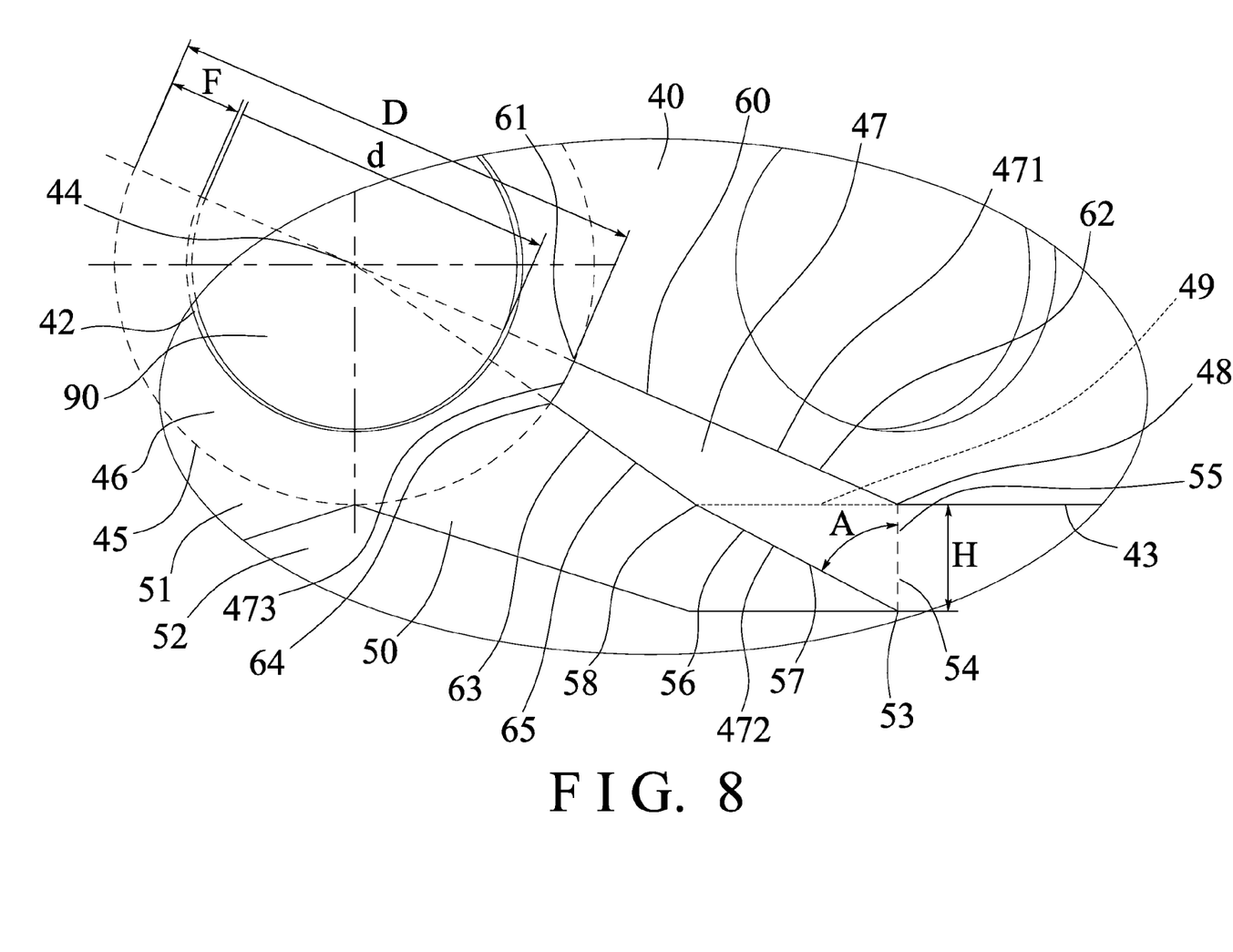
FIG. 8 is an enlarged partial plan schematic view of the retaining ring of the motion guide apparatus.

For example, as shown in FIGS. 7 and 8, the operating device 50 is disposed or located adjacent to one of the orifices or the selected or first orifice 42 of the actuating ring member 40, 41 having a center at 44, for receiving or engaging with the selected or first bearing member 90, 91, and the actuating ring member 40, 41 includes a concentric circle 45 formed or provided around the selected or first orifice 42 of the actuating ring member 40, 41 or the selected or first bearing member 90, 91, and the concentric circle 45 includes a diameter (D, FIG. 8) preferably equal to or no greater than the width (W, FIG. 7) of the actuating ring member 40, 41, and greater than the diameter (d) of the first orifice 42 of the actuating ring member 40, 41 and the first bearing member 90, 91 for about 1.15 to 2 times of the diameter (d) or for a distance or width (F), and thus for forming or defining a peripheral or annular portion or area or segment or member 46 having a thickness or width (F).

The operating device 50 is thus extended out from the first orifice 42 or the annular member 46 of the actuating ring member 40, 41 and the first bearing member 90, 91, and the operating device 50 includes one or more (such as two) actuating pawls or legs or tongues 51 extended radially and outwardly from the first orifice 42 or the annular member 46 or the inner side portion 43 of the actuating ring member 40, 41 and the first bearing member 90, 91 and thus for forming or defining a space 47 between the respective tongue 51 and the actuating ring member 40, 41, and the tongues 51 are extended opposite to each other or extended away from each other for forming or defining a C or V-shaped structure or configuration and for forming or defining a C or V-shaped recess or depression or notch 52 between the tongues 51.

As best shown in FIG. 8, the respective tongue 51 includes a tip 53 extended and located and spaced or separated from the inner side portion 43 of the actuating ring member 40, 41 for a spacing distance (H) and for forming or defining an opening 54 for the space 47 that is formed or defined between the tongue 51 and the actuating ring member 40, 41, the spacing distance (H) is preferably equal to or no greater than the width (T, FIG. 5) of the peripheral protrusion 29 of the ball nut 2, and the tongue 51 includes a normal line 55 extended from the tip 53 and perpendicular to and intersected with the inner side portion 43 of the actuating ring member 40, 41 at a first intersected point 48, and the tongue 51 includes an inner side portion or surface 56 having an outer segment 57 spaced or separated from the normal line 55 for an included angle (A) that is preferably ranged between 40 and 60 degrees, and intersected with an extension line 49 of the inner side portion 43 of the actuating ring member 40, 41 at an intermediate or middle or second intersected point 58.

A connecting or coupling or linking line 60 from the first intersected point 48 to the center 44 of the first orifice 42 of the actuating ring member 40, 41 and the first bearing member 90, 91 is intersected with the concentric circle 45 at another or third intersected point 61, and the line segment 62 between the first and the third intersected points 48, 61 forms or defines one or inner or first side portion 471 of the space 47 between the tongue 51 and the actuating ring member 40, 41, another connecting or coupling or linking line 63 from the second intersected point 58 to the center 44 of the first orifice 42 of the actuating ring member 40, 41 and the first bearing member 90, 91 is intersected with the concentric circle 45 at a further or fourth intersected point 64, and the line segment 65 between the second and the fourth intersected points 58, 64 and the outer segment 57 of the inner side portion or surface 56 of the tongue 51 form or define another or outer or second side portion 472 of the space 47 between the tongue 51 and the actuating ring member 40, 41.

The line segment 473 between the third and the fourth intersected points 61, 64 thus forms or defines an inner side or root portion 473 of the space 47 between the tongue 51 and the actuating ring member 40, 41, and thus for allowing the lubricating grease or oil to be suitably guided to flow into the space 47 that is formed or defined between the tongue 51 and the actuating ring member 40, 41, with or by the tongues 51. It is to be noted that the tongues 51 are extended opposite to each other or extended away from each other for allowing the tongues 51 to suitably and effectively engage with the lubricating grease or oil and to effectively operate or agitate or actuate or wipe and guide the lubricating grease or oil into the space 47 that is formed or defined between the tongue 51 and the actuating ring member 40, 41.

Figure 1:
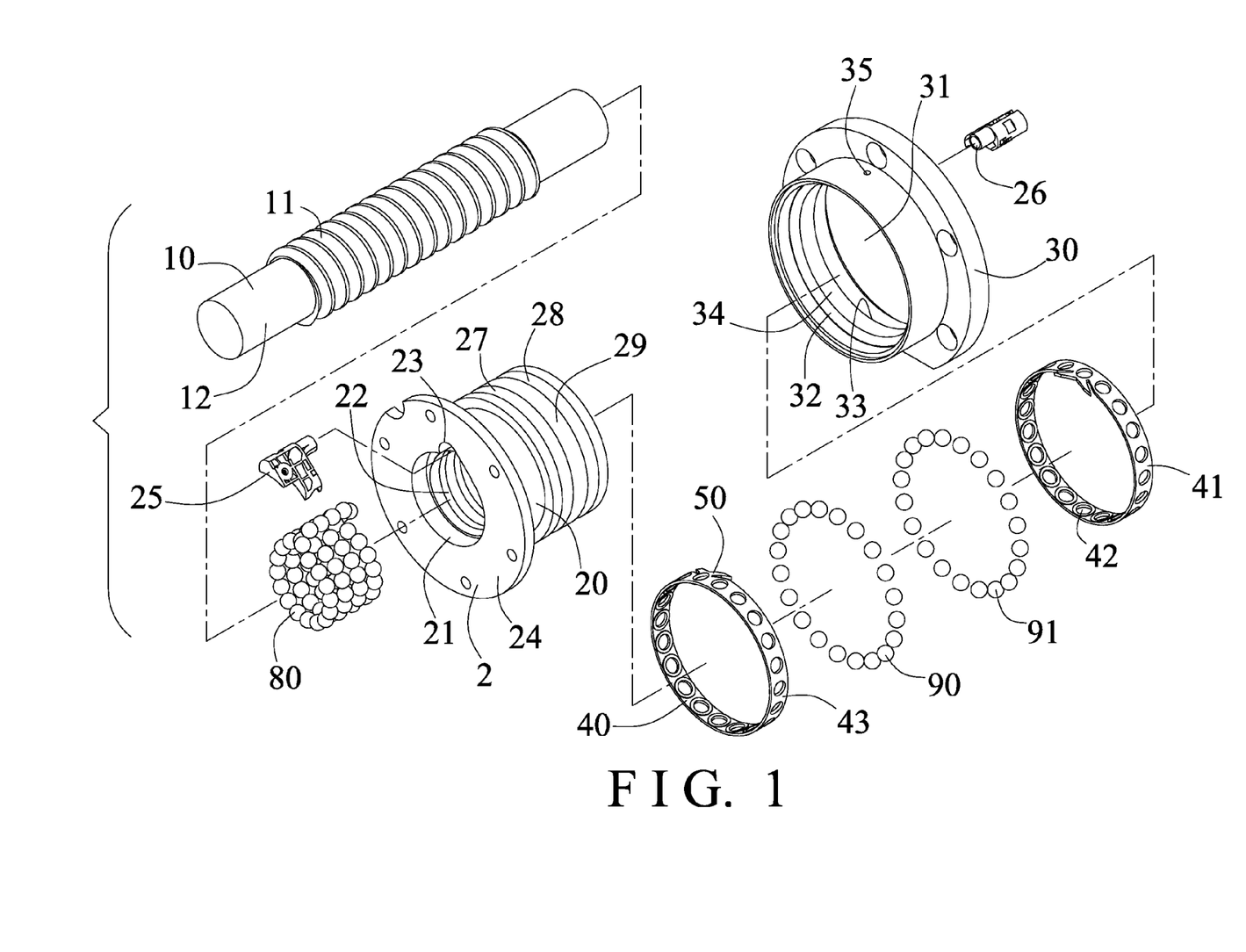
FIG. 1 is an exploded view of a motion guide apparatus in accordance with the present invention.
Figure 2:
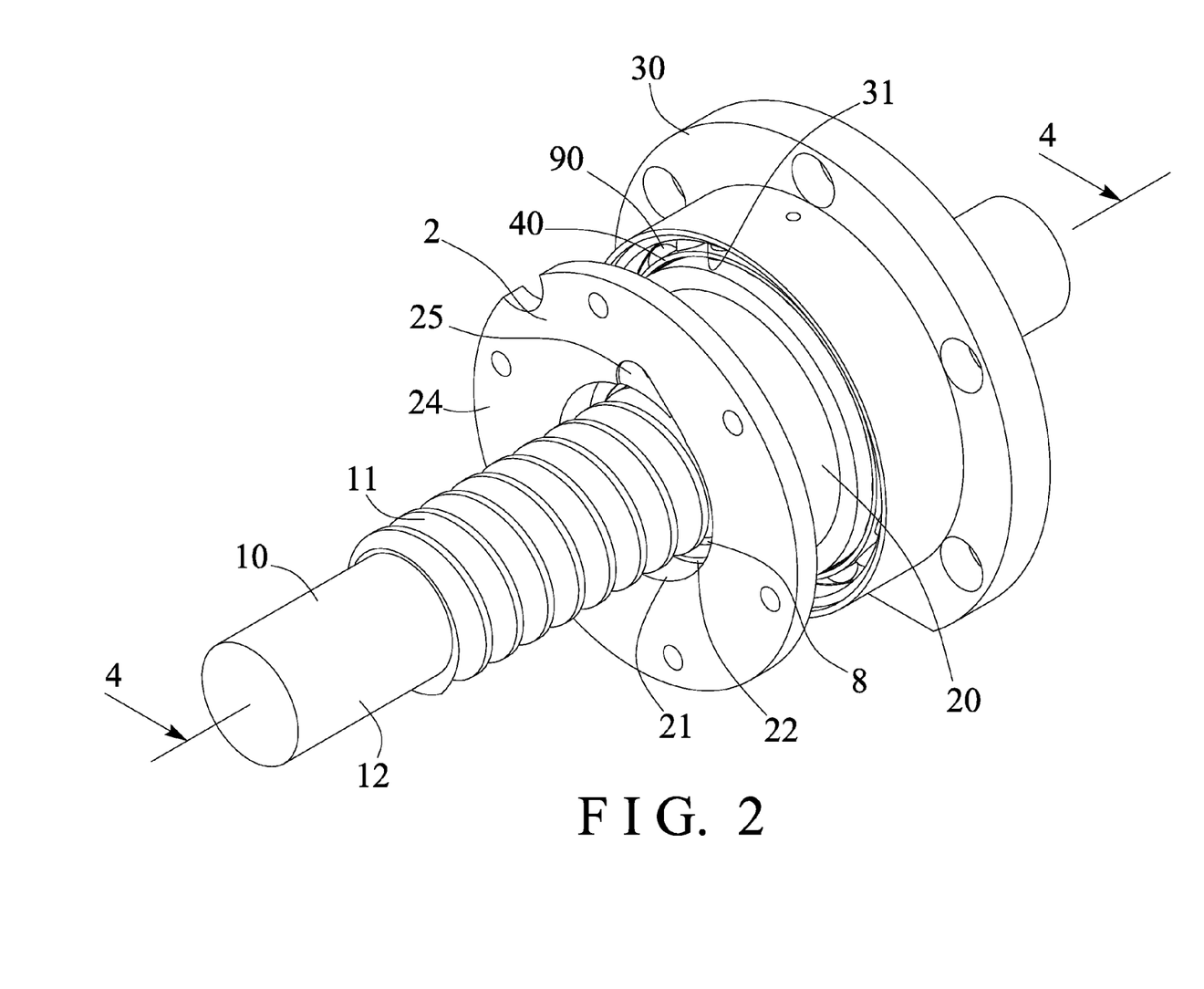
FIG. 2 is a perspective view of the motion guide apparatus.
Figures 3, 4:
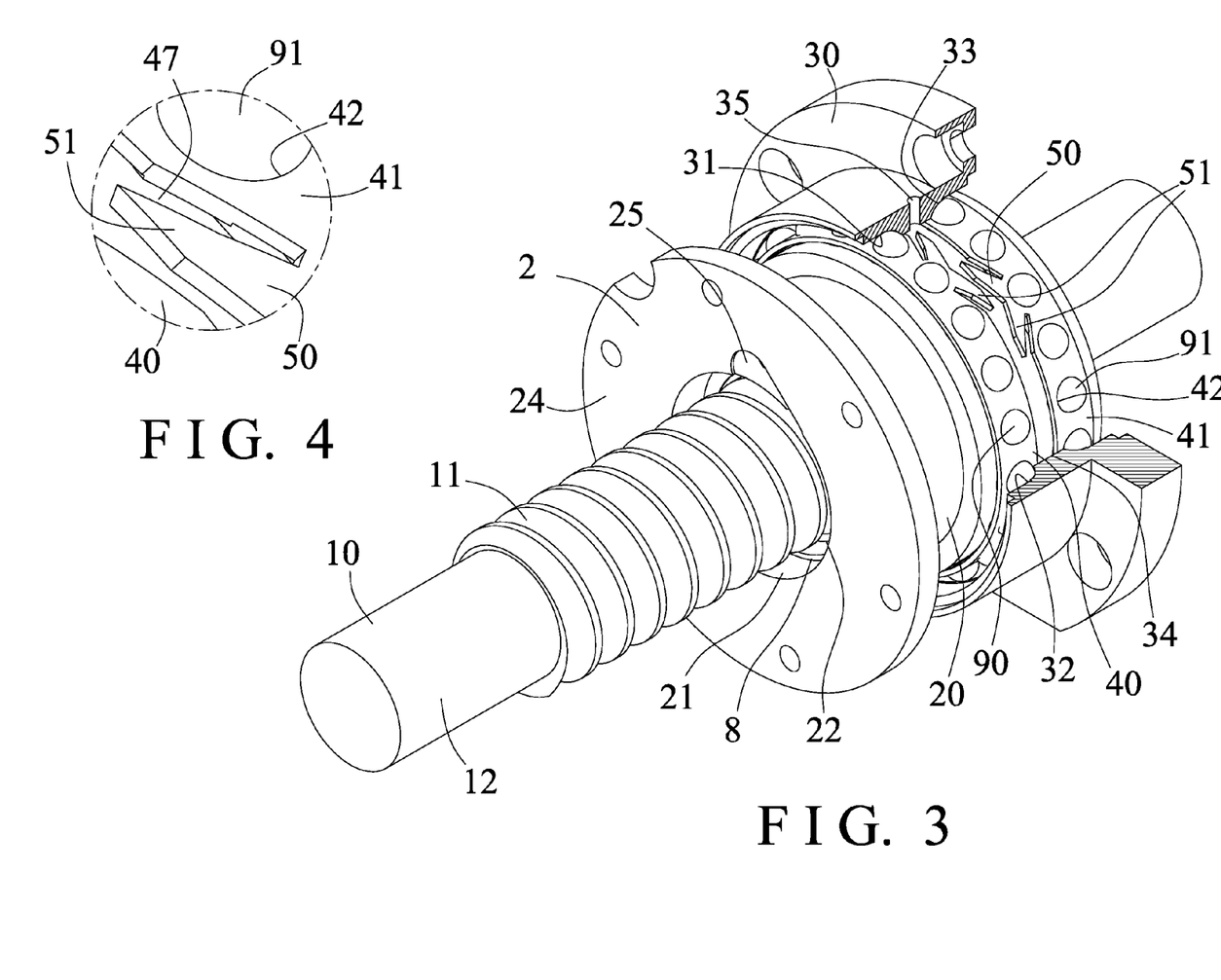
FIG. 3 is another perspective view similar to FIG. 2, in which a portion of the housing has been cut off for showing the inner structure of the motion guide apparatus.
FIG. 4 is an enlarged partial perspective view of the motion guide apparatus.
Figure 5:
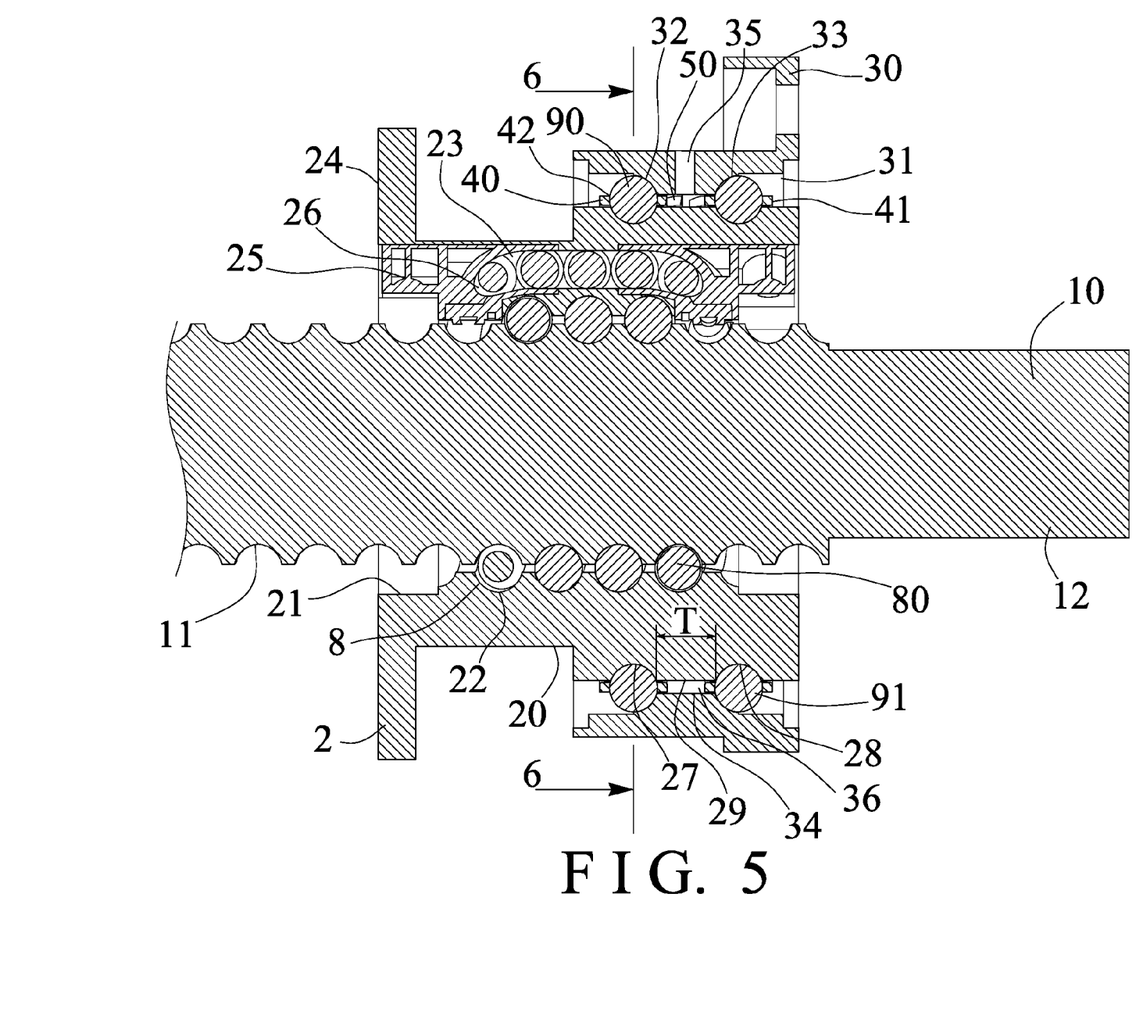
FIG. 5 is a partial cross sectional view of the motion guide apparatus, taken along lines 5-5 of FIG. 2.
Figure 6:
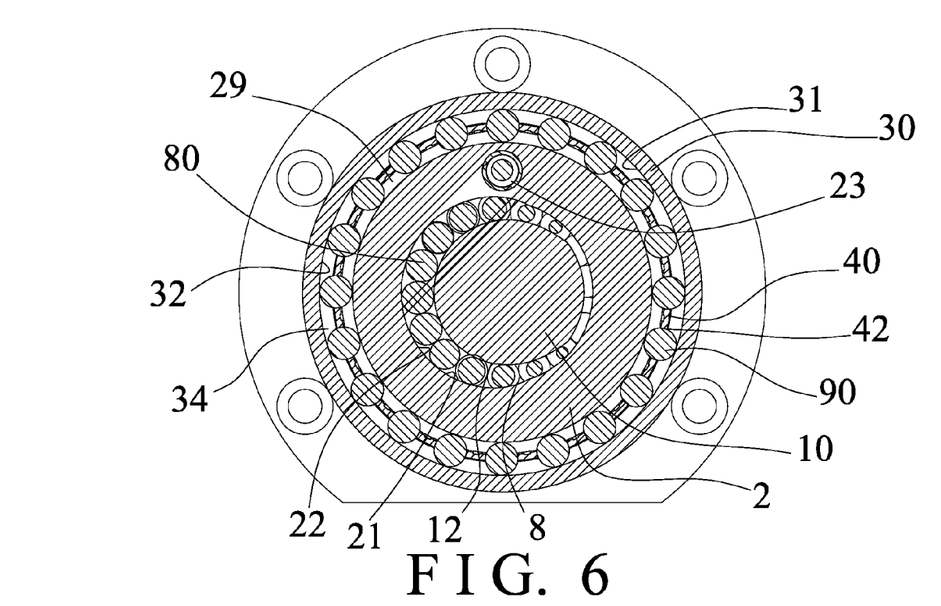
FIG. 6 is a cross sectional view of the motion guide apparatus, taken along lines 6-6 of FIG. 5.

In operation, as shown in FIGS. 3 and 5, the tongues 51 of the operating device 50 are extended into the peripheral gap 36 that is formed or defined between the peripheral protrusion 29 of the ball nut or cylindrical member 2 and the peripheral swelling 34 of the housing 30 for engaging with and for guiding the lubricating grease or oil to suitably and effectively flow toward the bearing members 90, 91 and/or the actuating ring members 40, 41 by or with the tongues 51. The tongues 51 that are extended opposite to each other or extended away from each other are formed integral with each other or secured with each other and may be taken as a single tongue having two tongue portions or segments 51 for suitably and effectively engaging with and agitating or actuating or wiping and guiding the lubricating grease or oil into the space 47 that is formed or defined between the tongue 51 and the actuating ring member 40, 41 when the housing 30 rotated relative to the ball nut or cylindrical member 2 in either the clockwise direction or the counter-clockwise direction.

Figure 9:
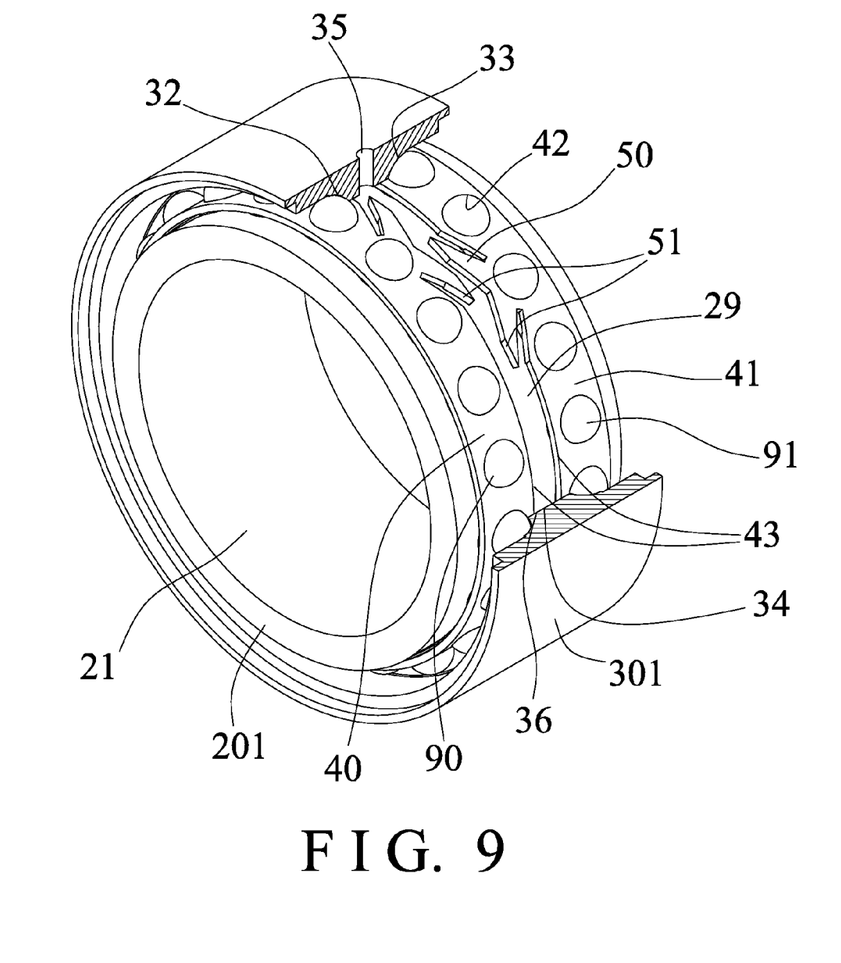
FIG. 9 is a further perspective view illustrating the other embodiment of the motion guide apparatus.

Alternatively, as shown in FIG. 9, the actuating ring members 40, 41 may also be disposed or attached or mounted or secured or engaged between any other two movable members, such as an inner cylindrical member 201 and an outer cylindrical member or housing 301, and the actuating ring members 40, 41 may also be used to suitably and solidly and stably anchor or retain or position or attach or mount or secure the bearing members 90, 91 between the housing 30 and the ball nut or cylindrical member 201, and the tongues 51 are also extended into the peripheral gap 36 that is formed or defined between the peripheral protrusion 29 of the ball nut or cylindrical member 201 and the peripheral swelling 34 of the housing 301 for engaging with and for guiding the lubricating grease or oil to flow toward the bearing members 90, 91 and/or the actuating ring members 40, 41.

Accordingly, the motion guide apparatus in accordance with the present invention includes a number of ball or roller bearing members disposed or attached or mounted or engaged between two movable members, such as an elongated bolt or screw shaft and a ball nut member, and a lubricating device for supplying or applying or distributing the lubricating grease or oil into the helical threaded portions or grooves of the movable members and for suitably lubricating the ball or roller bearing members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A motion guide apparatus comprising:
    a cylindrical member including an outer peripheral portion, and including two peripheral recesses formed in said outer peripheral portion of said cylindrical member and spaced from each other for forming and defining a peripheral protrusion between said peripheral recesses of said cylindrical member,
    a cylindrical housing including a bore formed therein for receiving and engaging with said cylindrical member, and including two peripheral depressions formed in said housing and spaced from each other for forming and defining a peripheral swelling between said peripheral depressions of said housing and for aligning with said peripheral protrusion of said cylindrical member and for forming and defining a peripheral gap between said peripheral protrusion and said peripheral swelling, said housing including an entrance for supplying a lubricating oil into said peripheral gap that is formed between said peripheral protrusion of said cylindrical member and said peripheral swelling of said housing,
    a plurality of bearing members received and engaged in said peripheral recesses of said cylindrical member and said peripheral depressions of said housing and engaged with said peripheral protrusion and said peripheral swelling for guiding said housing to rotate relative to said cylindrical member, and
    two actuating ring members each including a plurality of orifices formed therein for receiving and engaging with said bearing members respectively and for allowing said bearing members and said actuating ring members to be received and engaged between said housing and said cylindrical member, said actuating ring members each including an inner side portion directed toward said peripheral protrusion and said peripheral swelling, and each including an operating device provided in said inner side portion of said actuating ring member and extended into said peripheral gap that is formed between said peripheral protrusion and said peripheral swelling for engaging with and for guiding the lubricating oil to flow toward said actuating ring members and said bearing members; wherein said operating device includes two tongues extending from said inner side portion of said actuating ring member forming a space between each of said tongues and said actuating ring member.

2. The motion guide apparatus as claimed in claim 1, wherein said tongues are extended radially and outwardly from said inner side portion of said actuating ring member and opposite to each other for forming a V-shaped structure and for forming a notch between said tongues.

3. The motion guide apparatus as claimed in claim 1, wherein said actuating ring member includes a first orifice having a center for receiving and engaging with a first bearing member, and includes a concentric circle provided around said first orifice of said actuating ring member and said first bearing member, and said concentric circle includes a diameter (D) no greater than a width (W) of said actuating ring member and greater than a diameter (d) of said first orifice of said actuating ring member for forming an annular member, said tongues are extended from said annular member.

4. The motion guide apparatus as claimed in claim 3, wherein said diameter (D) of said concentric circle is 1.15 to 2 times of said diameter (d) of said first orifice of said actuating ring member.

5. The motion guide apparatus as claimed in claim 3, wherein said diameter (D) of said concentric circle is greater than said diameter (d) of said first orifice of said actuating ring member for a width (F), and said annular member includes a width (F).

6. The motion guide apparatus as claimed in claim 1, wherein said tongue includes a tip extended and separated from said inner side portion of said actuating ring member for a spacing distance (H) and for forming an opening for said space that is formed between said tongue and said actuating ring member.

7. The motion guide apparatus as claimed in claim 6, wherein said spacing distance (H) is no greater than a width (T) of said peripheral protrusion of said cylindrical member.

8. The motion guide apparatus as claimed in claim 6, wherein said tongue includes a normal line extended from said tip and perpendicular to and intersected with said inner side portion of said actuating ring member at a first intersected point, and said tongue includes an inner side surface having an outer segment spaced from said normal line for an included angle (A) and intersected with an extension line of said inner side portion of said actuating ring member at a second intersected point.

9. The motion guide apparatus as claimed in claim 8, wherein a linking line from said first intersected point to said center of said first orifice of said actuating ring member and said first bearing member is intersected with said concentric circle at a third intersected point, and a first line segment between said first and said third intersected points forms a first side portion of said space between said tongue and said actuating ring member, a coupling line from said second intersected point to said center of said first orifice of said actuating ring member and said first bearing member is intersected with said concentric circle at a fourth intersected point, and a second line segment between said second and said fourth intersected points and said outer segment of said inner side surface of said tongue form a second side portion of said space between said tongue and said actuating ring member.

10. The motion guide apparatus as claimed in claim 9, wherein a third line segment between said third and said fourth intersected points forms a root portion of said space between said tongue and said actuating ring member.

* * * * *